United States Patent [19]
Kish et al.

[11] Patent Number: 5,749,692
[45] Date of Patent: May 12, 1998

[54] FASTENER WITH POLYMER-COATED SHANK

[75] Inventors: Frederick A. Kish, Wheeling; Elizabeth J. Eckmann, Chicago; Lawrence S. Shelton, Morton Grove, all of Ill.

[73] Assignee: Illinois Tool Works Inc., Glenview, Ill.

[21] Appl. No.: 869,500

[22] Filed: Jun. 5, 1997

Related U.S. Application Data

[63] Continuation of Ser. No. 472,906, Jun. 7, 1995, abandoned, which is a continuation-in-part of Ser. No. 293,003, Aug. 19, 1994, Pat. No. 5,489,179.

[51] Int. Cl.⁶ ............................. F16B 15/06; F16B 15/08
[52] U.S. Cl. .......................... 411/453; 411/456; 411/903; 411/930
[58] Field of Search ............................... 411/258, 446, 411/451–453, 455, 456, 903, 922, 930

[56] References Cited

U.S. PATENT DOCUMENTS

| | | |
|---|---|---|
| 276,541 | 4/1883 | Sloan . |
| 426,008 | 4/1890 | Groff . |
| 1,326,910 | 1/1920 | Butterfield . |
| 1,912,222 | 5/1933 | Rosenberg . |
| 2,075,411 | 3/1937 | Von Mertens . |
| 2,093,610 | 9/1937 | Kraemer . |
| 2,190,883 | 2/1940 | Pauze . |
| 2,226,006 | 12/1940 | Maze ............................ 411/453 |
| 2,269,708 | 1/1942 | Dickson . |
| 2,967,448 | 1/1961 | Hallock . |
| 3,010,353 | 11/1961 | Psaros . |
| 3,019,460 | 2/1962 | Corckran . |
| 3,088,361 | 5/1963 | Hallock . |
| 3,233,498 | 2/1966 | Handja . |
| 3,568,746 | 3/1971 | Faroni et al. . |
| 3,813,985 | 6/1974 | Perkins . |
| 3,850,073 | 11/1974 | Hayes . |
| 3,861,527 | 1/1975 | Perkins ........................ 206/344 |
| 3,977,142 | 8/1976 | Dove et al. ..................... 52/363 |
| 4,664,733 | 5/1987 | Masago ......................... 156/212 |
| 4,718,802 | 1/1988 | Rockenfeller ................... 411/455 |
| 4,837,090 | 6/1989 | Hyner et al. .................... 428/626 |
| 4,915,561 | 4/1990 | Buhri et al. .................... 411/439 |
| 4,964,774 | 10/1990 | Lat et al. ...................... 411/446 |
| 5,149,237 | 9/1992 | Gabriel et al. .................. 411/446 |
| 5,261,770 | 11/1993 | Hoepker ........................ 411/441 |
| 5,375,957 | 12/1994 | Golledge ....................... 411/453 |
| 5,441,373 | 8/1995 | Kish et al. ..................... 411/442 |

FOREIGN PATENT DOCUMENTS

| | | | |
|---|---|---|---|
| 1115028 | 12/1955 | France ......................... | 411/453 |
| 57-35693 | 8/1982 | Japan . | |

OTHER PUBLICATIONS

*Monozukuri Katai Shinsyo*, pp. 22 and 23, Oct. 20, 1992.
Japanse Patent Public Disclosure No. 4–357313, dated Dec. 10, 1992.
Japanese Utility Model No. 57–45446, dated Oct. 6, 1982.
Japanese Patent Publication No. 4–57415, dated Sep. 11, 1992.
Japanese Utility Model No. 15–16699, dated 1925.
Japanese Utility Model No. 3–54964, dated Dec. 5, 1991.
Japanese Utlity Model No. 44–4505, dated 1965.

*Primary Examiner*—Neill R. Wilson
*Attorney, Agent, or Firm*—Rockey, Milnamow & Katz, Ltd.

[57] ABSTRACT

A fastener is formed from carbon steel wire so as to have an elongate shank defining an axis, an enlarged head formed at one end of the shank, and a generally pointed tip formed at the other end of the shank. The shank has a ringed portion formed with annular grooves defining annular rings and with helical grooves intersecting the annular grooves and defining helical ribs. The fastener is heat-treated, zinc-plated, and chromate-coated. Substantially all of the shank or of the fastener, as a whole, is further coated with a polymeric material to resist corrosion, to improve ease of driving the fastener, and to increase holding power of the fastener when driven through a wood, plywood, or plasterboard workpiece and then through a steel framing member. Substantially all of the shank or of the fastener, as a whole, may be thus coated with the polymeric material. The polymeric material softens and flows upon penetration and rehardens.

5 Claims, 1 Drawing Sheet

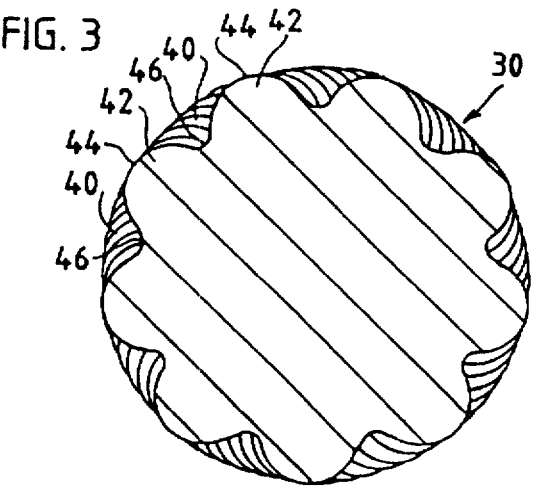
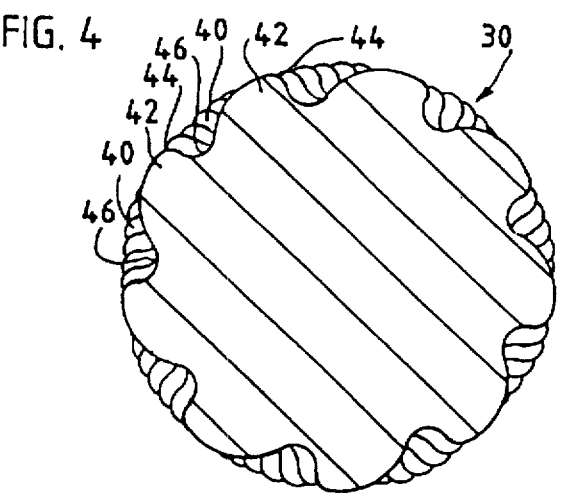
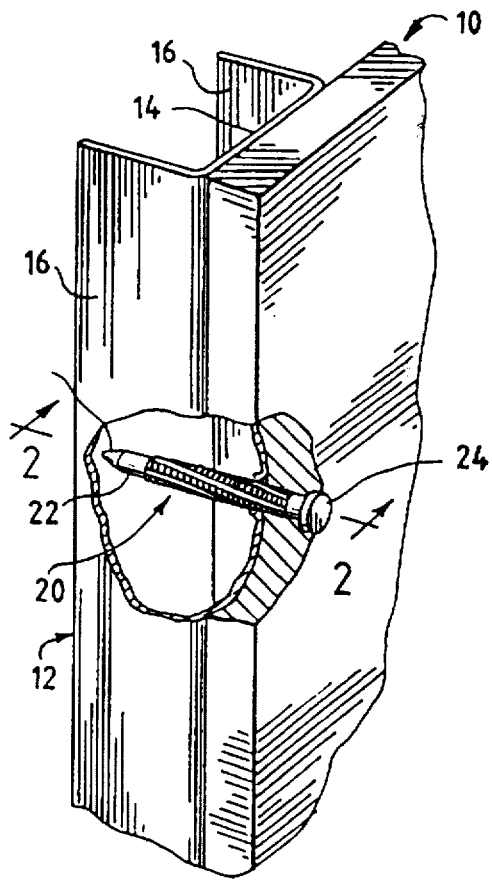
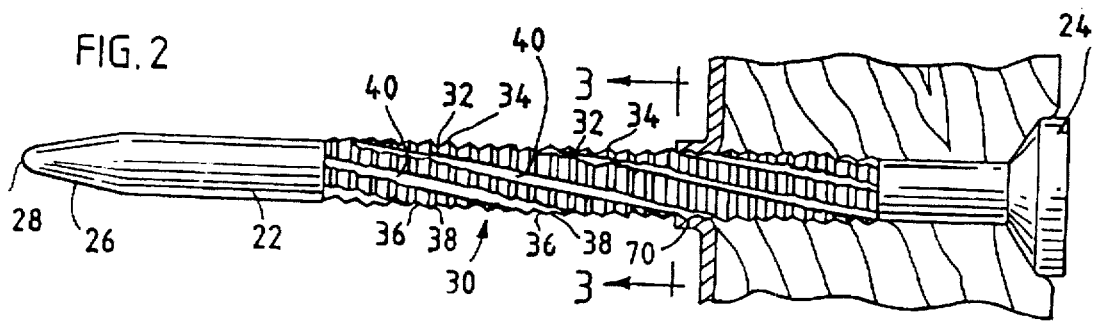

1

FASTENER WITH POLYMER-COATED SHANK

CROSS-REFERENCE TO RELATED APPLICATION

This application is a continuation of U.S. Pat. No. 08/472,906, now abandoned, which was filed on Jun. 7, 1995. U.S. patent application Ser. No. 08/472,906 is a continuation-in-part of U.S. patent application Ser. No. 08/293,003, which was filed on Aug. 19, 1994, now U.S. Pat. No. 5,489,179.

This invention pertains to a fastener, which is coated with a polymeric material to resist corrosion, to improve ease of driving the fastener, and to increase holding power of the fastener. The fastener is useful for fastening a workpiece having a given thickness to a metal substrate having a thinner wall and secondarily for fastening such a workpiece to a wooden substrate.

BACKGROUND OF THE INVENTION

Fasteners of various configurations are known for fastening relatively thick workpieces, such as boards made of plywood or plasterboard, to various substrates, such as metal framing members, wooden framing members, and wooden underlayments. Commonly, such fasteners have elongate shanks defining axes and are designed to be axially driven by powered tools, such as pneumatically powered tools or combustion-powered tools.

A fastener having a tapered shank, a series of rings or ridges along the tapered shank, and helical grooves along the series of rings or ridges and appearing to be particularly useful for fastening a wooden board to a wooden underlayment is disclosed in Rockenfeller et al. U.S. Pat. No. 4,718,802. Other fasteners of various configurations for fastening relatively thick workpieces to metal substrates having relatively thin walls are exemplified in Rosenberg U.S. Pat. No. 1,912,222, von Mertens U.S. Pat. No. 2,075,411, and Hayes U.S. Pat. No. 3,850,073.

An improved fastener, which is useful for fastening a workpiece having a given thickness to a metal substrate having a thinner wall, is disclosed in U.S. patent application Ser. No. 08/293,003, supra. As disclosed therein, the improved fastener has a shank with a ringed portion, which is formed with annular grooves defining annular rings, and which is divided by a cylindrical land or cylindrical lands into ringed subportions. As disclosed therein, the shank may be also formed with helical grooves intersecting the annular grooves and defining helical ribs.

SUMMARY OF THE INVENTION

This invention provides an improved fastener, which is useful for fastening a workpiece having a given thickness, such as a wooden, plywood, or plasterboard workpiece, to a metal substrate having a thinner wall, such as a steel framing member, and secondarily for fastening such a workpiece to a wooden substrate, such as a wooden framing member or a wooden underlayment. The improved fastener may be readily adapted to be axially driven by a powered tool, such as a pneumatically powered tool or a combustion-powered tool.

As provided by this invention, the improved fastener has an elongate shank defining an axis, an enlarged head formed at one end of the shank, and a generally pointed tip formed at the other end of the shank. Moreover, the shank has a ringed portion formed with annular grooves defining annular rings.

2

As contemplated by this invention, substantially all of the shank is coated with a polymeric material, preferably thermoset, to resist corrosion, to improve ease of driving the fastener, and to increase holding power of the fastener when driven through a wooden, plywood, or plasterboard workpiece and then through a steel framing member. Substantially all of the fastener, as a whole, may be thus coated.

Preferably, the polymeric material is selected from a group that has a softening point that does not exceed the temperature that the fastener reaches when driven. More preferably, the polymeric material is selected from a group that has a softening point that is substantially similar to the temperature that the fastener reaches when driven. The polymeric material flows upon penetration to increase holding power of the fastener, as when the fastener is driven through a wooden, plywood, or plasterboard workpiece and then through a steel framing member.

In some applications, the temperature that the fastener reaches when driven has been measured as between 120° and 150° F. Herein, the softening point refers to the glass transition temperature of the polymeric material.

Preferably, the fastener is heat-treated, zinc-plated, and chromate-coated, and substantially all of the shank is further coated with the polymeric material. Substantially all of the shank or substantially all of the fastener, as a whole, may be thus coated with the polymeric material.

These and other objects, features, and advantages of this invention are evident from the following description of two embodiments of this invention with reference to the accompanying drawings.

BRIEF DESCRIPTION OF THE DRAWINGS

FIG. 1 is a fragmentary, perspective, partly cutaway view of a building assembly comprising a workpiece having a given thickness, namely a wooden board, a metal substrate having a thinner wall, namely a metal framing member, and a fastener constituting a preferred embodiment of this invention. As shown in FIG. 1, the fastener has an elongate shank having a ringed portion.

FIG. 2, on an enlarged scale, is a sectional view taken along line 2—2 of FIG. 1, in a direction indicated by arrows.

FIGS. 3 and 4, on a further enlarged scale, are sectional views taken along line 3—3 of FIG. 2, in a direction indicated by arrows.

DETAILED DESCRIPTION OF THE ILLUSTRATED EMBODIMENTS

As shown in FIG. 1, a building assembly comprises a relatively thick board 10, a metal framing member 12 having a relatively thin wall 14 and two relatively thin flanges 16 extending normally from the relatively thin wall 14, and a fastener 20 constituting a preferred embodiment of this invention.

The board 10 may be made from wood, plywood, or plasterboard. The framing member 12 may be made from galvanized steel. The fastener 20 may be made from 1030 carbon steel wire, heat-treated to a core hardness of 40 to 45 Rockwell C and to a surface hardness of 42 to 50 Rockwell C, zinc-plated, and chromate-coated.

The fastener 20 has an elongate shank 22 defining an axis, an enlarged head 24 formed at one end of the shank 22 and chamfered where the head 24 faces the shank 22, and a generally pointed tip 26 formed at the other end of the shank 22. Preferably, as shown, the tip 26 is frusto-conical except for a rounded end 28. Herein, it is convenient to regard the shank 22 as including the tip 24.

The shank 22 has a ringed portion 30 formed with a series of annular grooves 32 and a series of annular rings 34. Where the annular grooves 32 are deepest, the annular grooves 32 define an imaginary cylinder. The annular rings 34 are spaced axially from one another by the annular grooves 32. Where the annular rings 34 are largest, the annular rings 34 define an imaginary cylinder. Thus, the annular rings 34 have a uniform, outer diameter. Each annular ring 34 has a frusto-conical, leading surface 36 facing toward the tip 26 and defining a comparatively small, acute angle relative to the axis and a frusto-conical, trailing surface 38 facing toward the head 24 and defining a comparatively large, acute angle relative to the axis.

Each annular groove 32 may be rounded at a small radius where the frusto-conical surfaces bounding such groove 32, namely the leading surface 36 of one such ring 34 and the trailing surface 38 of the next ring 34 in the axial direction of the tip 26, would intersect if such annular groove 32 were not rounded. Each annular ring 34 may be rounded at a small radius where the leading surface 36 of such ring 34 and the trailing surface 38 of such ring 34 would intersect if such annular ring 34 were not rounded.

The ringed portion 30 has a circumferential array of helical grooves 40 intersecting the annular grooves 32 and defining a circumferential array of helical ribs 42 intersecting the annular rings 34. Each helical rib 42 has a rounded crest 44, which is tangent with the imaginary cylinder defined by the annular rings 34, where such helical rib 42 is largest. Each helical groove 40 has a rounded valley 46, which is tangent with the imaginary cylinder defined by the annular grooves 32, where such helical groove 40 is deepest.

Preferably, as shown in FIG. 3, each helical groove 40 taken in cross-section is symmetrical with respect to a plane comprising the axis defined by the shank 22 and intersecting such helical groove 40 where such helical groove 40 is deepest.

After the fastener 20 has been heat-treated, zinc-plated, and chromate-coated, Substantially all of the shank 22 or substantially all of the fastener 20, as a whole, is coated with a polymeric material to resist corrosion, to improve ease of driving the fastener 20, and to increase holding power of the fastener 20, as when the fastener 20 is driven through a wooden, plywood, or plasterboard workpiece, such as the board 10, and then through a steel framing member, such as the framing member 12. Although is sufficient for substantially all of the shank 22 (but not the head 24) to be so coated with the polymeric material, it is preferable for substantially all of the fastener 20, as a whole, to be so coated with the polymeric material.

It has been measured that the exterior temperature of the shank 22 upon penetration of the substrate can reach a range of approximately 120° to 150° F. Suitable polymeric materials have a softening point in that range, so that they soften and flow upon penetration and reharden in a slightly different orientation. This both aids in ease of driving and increases holding power. Both thermoplastic and thermoset materials have been found to be thus suitable.

A polyester-based, thermoset material is a suitable coating material, as exemplified by Corvel Stardust Silver No. 23-9082 polyester [poly(ethylene terephthalate)] powder coating, which can be electrostatically applied and which is available commercially from Morton International Powder Coatings of Reading, Pa. An acrylic-based, thermoplastic material is a suitable coating material, as exemplified by Maincote PR-71 waterborne acrylic resin, which can be applied by spraying or dipping and which is available commercially from Rohm & Haas Company of Cleveland, Ohio. An epoxy-based, thermoset material is a suitable coating material, as exemplified by Evlast Epoxy Powder Coatings, 2000 Series, which can be electrostatically applied and which are available commercially from Evtech (a Kodak Company) of Charlotte, N.C.

The polymeric coating may be one of the polyester-based or epoxy-based coatings disclosed in U.S. patent application Ser. No. 116,758, which was filed on Sep. 7, 1993, and the disclosure of which is incorporated herein by reference.

As shown in FIG. 2, the fastener 20 is driven through the relatively thick board 10 and through the relatively thin wall 14 so that the head 24 bears against and is countersunk partially into the board 10 and so that the tip 26 and the shank 22 form, from the wall 14, a generally annular lip 70 projecting toward the tip 26 and so that the lip 70 is disposed around the shank 22. Desirably, the polymeric material coating the shank 22 softens as the shank 22 penetrates the wall 14 and rehardens, so as to produce a mechanical and/or adhesive seal.

The fastener 20 may be alternatively used to fasten a board, such as the board 10, to a wooden substrate (not shown) that may be as thick as or thicker than the board being fastened to the wooden substrate.

Various modifications may be made in the preferred and alternative embodiments described above without departing from the scope and spirit of this invention.

We claim:

1. A fastener formed from steel wire so as to have a shank, an enlarged head formed at one end of the shank, and a generally pointed tip formed at the other end of the shank, the shank having a ringed portion formed with annular grooves defining annular rings, wherein substantially all of the shank is coated with a thermoset, polymeric material which has a softening point that does not exceed the temperature that the fastener reaches when driven so as to flow upon penetration and so as to resist corrosion, to improve ease of driving the fastener, and to increase holding power of the fastener, as when the fastener is driven through a wooden plywood, or plasterboard workpiece and then through a steel framing member.

2. The fastener of claim 1 wherein substantially all of the shank is coated with an epoxy-based material.

3. The fastener of claim 1 wherein the ringed portion of the shank is formed with helical grooves intersecting the annular grooves and defining helical ribs.

4. A fastener formed from steel wire so as to have a shank, an enlarged head formed at one end of the shank, and a generally pointed tip formed at the other end of the shank, the shank having a ringed portion formed with annular grooves defining annular rings and with helical grooves intersecting the annular grooves and defining helical ribs, wherein the fastener is heat-treated, zinc-plated, and chromate coated and wherein substantially all of the shank is further coated with a thermoset, polymeric material which has a softening point that does not exceed the temperature that the fastener reaches when driven, so as to flow upon penetration and so as to resist corrosion, to improve ease of driving the fastener, and to increase holding power of the fastener, as when the fastener is driven through a wooden, plywood, or plasterboard workpiece and then through a steel framing member.

5. The fastener of claim 4 wherein substantially all of the shank is coated with an epoxy-based material.

\* \* \* \* \*